US009092567B2

(12) United States Patent
Vedula et al.

(10) Patent No.: US 9,092,567 B2
(45) Date of Patent: Jul. 28, 2015

(54) SYSTEMS AND METHODS FOR ANALYZING TRANSACTIONS IN A COMPUTER SYSTEM

(75) Inventors: Vivekananda M. Vedula, Austin, TX (US); Jayanta Bhadra, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 427 days.

(21) Appl. No.: 13/538,496

(22) Filed: Jun. 29, 2012

(65) Prior Publication Data

US 2014/0006875 A1   Jan. 2, 2014

(51) Int. Cl.
  *G06F 11/00* (2006.01)
  *G06F 11/36* (2006.01)
  *G06F 11/07* (2006.01)
  *G06F 11/30* (2006.01)

(52) U.S. Cl.
  CPC ........ *G06F 11/3636* (2013.01); *G06F 11/0775* (2013.01); *G06F 11/3068* (2013.01)

(58) Field of Classification Search
  CPC .............................. G06F 11/0775; G06F 11/34
  See application file for complete search history.

(56) References Cited

U.S. PATENT DOCUMENTS

| | | | |
|---|---|---|---|
| 5,491,793 A | 2/1996 | Somasundaram et al. | |
| 5,937,154 A | 8/1999 | Tegethoff | |
| 6,785,850 B2 | 8/2004 | Dzoba et al. | |
| 2009/0240742 A1* | 9/2009 | Burghard et al. | ............. 707/202 |
| 2012/0151488 A1* | 6/2012 | Arcese et al. | ................. 718/101 |

OTHER PUBLICATIONS

Brahme, D.S., et al., "The Transaction-Based Verification Methodology", Cadence Berkeley Labs, Technical Report #CDNL-TR-2000-0825, Aug. 2000, pp. 1-8.
Tang, S., et al., "A Multi-Core Debug Platform for NoC-Based Systems", IEEE, Design, Automation & Test in Europe Conference & Exhibition, Apr. 16-20, 2007, pp. 1-6.
Martin, G., "Overview of the MPSoC Design Challenge", Design Automation Conference, 43rd ACM/IEEE, 2006, pp. 274-279.
Oddone, R., "Cadence Verification Overview", State-of-the-Art Debug Tool from Cadence—Incisive Debug Message Analyzer, CDNLive, Beijiing, Aug. 2012, pp. 1-16.

* cited by examiner

*Primary Examiner* — Michael Maskulinski

(57) ABSTRACT

Transactions in a multi-component system have corresponding local identifiers uniquely identifying the transaction among transactions within a particular functional block of the device under test. For each transaction, it is determined whether the transaction is a new request, a handshake request corresponding to a previously generated request, or a response. In response to determining that a transaction of the plurality of transactions is a new request, a global identifier is assigned to the new request which uniquely identifies the new request among new requests of all functional blocks of the device under test. A global entry corresponding to the new request is stored that includes the global identifier of the new request, an indicator of a functional block of the device under test which generated the new request, and a local identifier uniquely identifying the new request within the first functional block.

20 Claims, 6 Drawing Sheets

| GID | CYCLE | DEVICE GENERATING REQ/RESP | LOCAL TAG | TYPE | ATTRIB |
|---|---|---|---|---|---|
| 502 ⟶ 0 | 1278238 | P0 | 0x0 | LOAD | |
| 504 ⟶ 1 | 1278238 | P5 | 0x0 | LOAD | |
| ⋯ | | | | | |
| 506 ⟶ 0 | 1278300 | P0_CIU0 | 0x0 | LOAD | TAG: 0x1 |
| ⋯ | | | | | |
| 508 ⟶ 1 | 1278320 | P5_CIU1 | 0x0 | LOAD | TAG: 0x2 |
| ⋯ | | | | | |
| 510 ⟶ 0 | 1278330 | CIU0 | 0x1 | N/A | (DATA 1, ADDR 1) |
| 512 ⟶ 1 | 1278350 | CIU1 | 0x2 | N/A | (DATA 1 …) |
| 514 ⟶ 0 | 1278390 | CIU0 | 0x1 | N/A | (DATA 2 …) |
| 516 ⟶ 1 | 1278400 | CIU1 | 0x2 | N/A | (DATA 2 …) |
| 518 ⟶ 0 | 1278410 | CIU0 | 0x1 | N/A | (DATA 3 …) |

| GID | LINK LIST |
|---|---|
| 602 ⟶ 0 | (P0: 0x0), (CIU0: 0x1) |
| 604 ⟶ 1 | (P5: 0x0), (CIU1: 0x2) |

| GID | | CYCLE | INITIATOR OF TRANSACTION | LOCAL TAG | ADDRESS | TYPE | STATUS |
|---|---|---|---|---|---|---|---|
| 702 ~ | 0 | @1278238 | P0 | 0x0 | 0xffffe000 | LOAD | C |
| 704 ~ | 1 | @1278238 | P5 | 0x1 | 0xffffe000 | LOAD | I |
| 706 ~ | 2 | @1278238 | P1 | 0x2 | 0xffffe000 | FETCH | C |
| 708 ~ | 3 | @1278238 | P5 | 0x0 | 0xffffe000 | INVALIDATE | C |
| 710 ~ | 4 | @1278238 | P4 | 0x1 | 0xffffe000 | FETCH | C |
| 712 ~ | 5 | @1278238 | P1 | 0x3 | 0xffffe000 | SYNC | C |
| 714 ~ | 6 | @1278302 | P2 | 0x4 | 0xffffe020 | QUERY | C |
| 716 ~ | 7 | @1278302 | P3 | 0x5 | 0xffffe020 | LOAD | C |
| 718 ~ | 8 | @1278302 | P0 | 0x6 | 0xffffe020 | NOTIFY | C |
| 720 ~ | 9 | @1278330 | P0 | 0x7 | 0xffffe020 | STORE | C |
| 722 ~ | 10 | @1278330 | P1 | 0x8 | 0xffffe020 | ABORT | P |
| 724 ~ | 6091 | @2655134 | P4 | 0x2 | 0x100d3c0 | INVALIDATE | I |
| 726 ~ | 6266 | @2800926 | P5 | 0x3 | 0x2181380 | LOAD | I |
| 728 ~ | 6267 | @2802718 | P3 | 0x9 | 0x2fe13a0 | INVALIDATE | I |
| 730 ~ | 6268 | @2805278 | P2 | 0xA | 0x29a1460 | STORE | I |

FIG. 7

SYSTEMS AND METHODS FOR ANALYZING TRANSACTIONS IN A COMPUTER SYSTEM

BACKGROUND

1. Field

This disclosure relates generally to computer systems, and more specifically, to analyzing modules executed in a computer system.

2. Related Art

Prior to implementing a semiconductor design on silicon, a software representation of the design can be generated to simulate the operation of components in the design. Semiconductor designs often include a variety of components that perform designated processing functions. Debugging software modules of multi-component devices can require examining and analyzing long failure traces. The failure analysis can be further complicated by sharing data among different memory modules including different levels of cache memory in systems with multiple processing components. Although the various processing components track transactions locally, the transactions are not tracked among the various components in the rest of the system.

In order to trace failures in multiprocessor systems, existing techniques require the user to tediously track through each component during debug to determine where the failure occurs.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 5 illustrates examples of entries in an embodiment of a global identifier database that can be used in the processing system of FIG. 1 to test and analyze the device under test of FIG. 2.

FIG. 6 illustrates examples of mapping entries in an embodiment of a global identifier database that includes global identifier and link list information that can be used in the processing system of FIG. 1 to test and analyze the device under test of FIG. 2.

FIG. 7 illustrates entries in an embodiment of a database that includes results from the processing system of FIG. 1 to test and analyze the device under test of FIG. 2.

DETAILED DESCRIPTION

Embodiments of systems and methods disclosed herein provide a powerful debugging tool that analyzes log files to generate a database of results that indicate one or more components in a simulated multi-component device that failed to complete processing one or more transactions. The results allow a developer to quickly identify the particular component(s) that need to be corrected, as well as components that completed processing the transactions.

Figure 1:
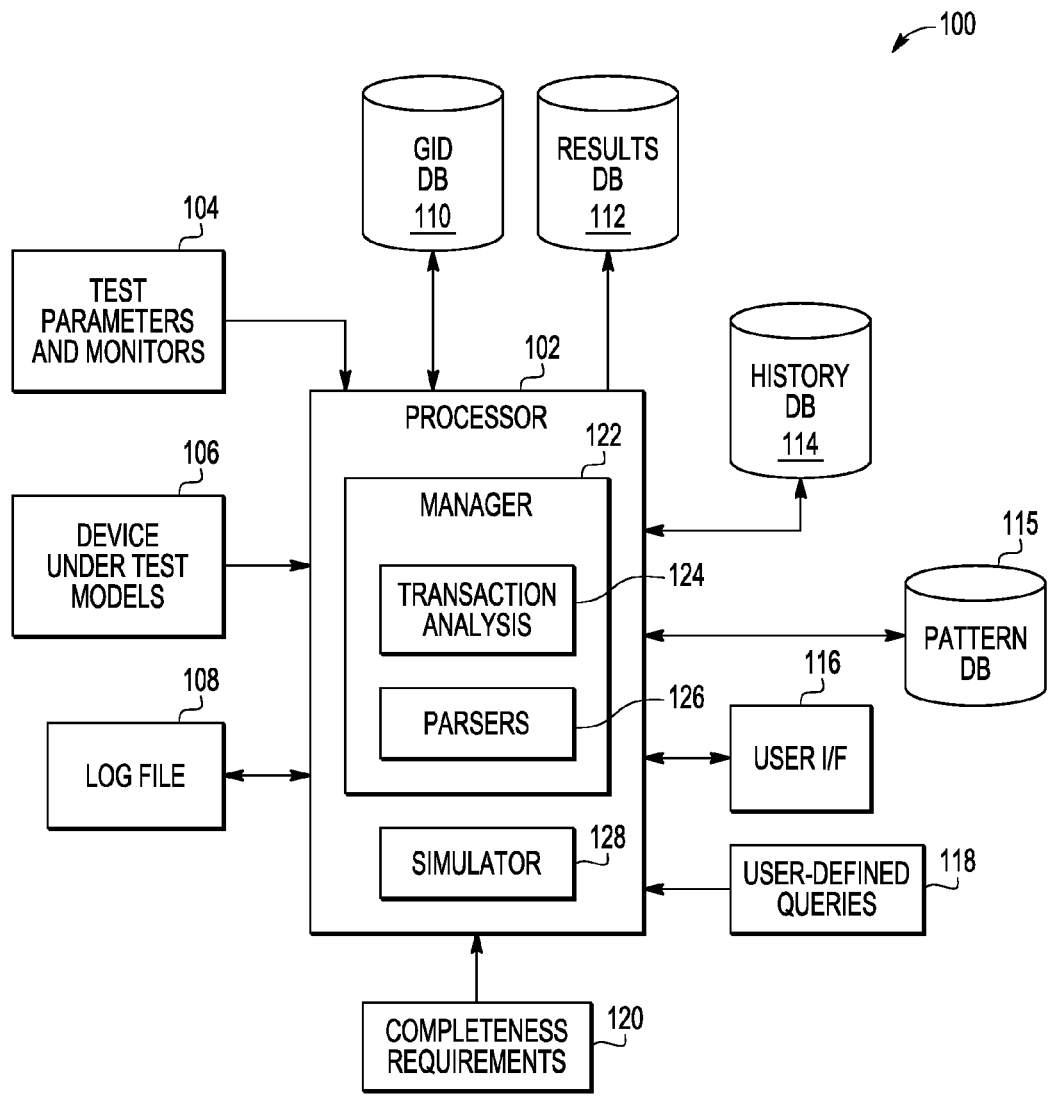
FIG. 1 shows a block diagram of a processing system that can be used to debug a multi-component device in accordance with embodiments of the present disclosure.

FIG. 1 shows a block diagram of a processing system 100 that can be used to design, simulate, and analyze multi-component electronic systems in accordance with embodiments of the present disclosure. System 100 includes processor 102, test parameters and monitors unit 104, device under test (DUT) models 106, log file 108, global identifier database 110, results database 112, history database 114, pattern database 115, user interface 116, user-defined queries 118, and completeness requirements 120. System 100 can also include other components that perform functions in addition to the functions performed by the components shown.

Processor 102 can include manager module 122 with transaction analysis module 124 and parser modules 126, and simulator 128. Transaction analysis module 124 includes logic to determine whether a transaction is a request made by a new transaction, a response, or a request that is part of transaction already in progress (i.e., a transaction that generates more than one request). If the request is being made by a new transaction, transaction analysis module 124 can assign a new global identifier that uniquely identifies the transaction from among all transactions performed by the simulated multi-component device, no matter which component of the multi-component device generated the transaction. If the request is part of a transaction that has already been assigned a global identifier, the transaction analysis module 124 can assign the global identifier that is already associated with the transaction to the request. Similarly, responses can also be assigned or "inherit" the global identifier associated with the corresponding request. The global identifier allows each transaction to be traced through each component of the multi-component device. The transaction analysis module 124 generates results database 112 that includes a list of the requests and responses along with their global identifiers along with an indication of the component that originated the transaction and whether the transaction completed. Results database 112 can then be used to determine which components are not operating properly, thus allowing developers to zoom in on the component(s) that are not operating as intended. The design for the component(s) can then be corrected before the design is implemented in hardware. Transaction analysis module 124 can be implemented as a system level script that runs after a simulation scenario or test run has completed.

Parser modules 126 can be implemented as scripts at the component level, i.e., a parser module for each component being analyzed. Parser modules 126 parse attributes of each component, such as local tags, transaction type, address, priority, among others, and insert one or more of the attributes in results database 112. The attributes can be retrieved from log file 108. Log file 108 can be generated by simulator module 128 and can include information for each transaction, such as which component initiated a transaction along with the attributes of the transaction and initiating module.

Simulator 128 executes DUT models 106, which are software representations of the components in the system to be analyzed/debugged. DUT model 106 are mathematical models that replicate the behavior or an actual electronic device or circuit. Simulator 128 communicates with user interface 116 and user-defined queries 118 to vary test scenarios according to user input and output results, often in the form of waveforms, to a display at user interface 116. User interface 116 can also include input devices such as a keyboard, mouse, touch screen, voice recognition, and/or other interface devices that allow the user to interact with and control operation of simulator 128. An example of simulator 128 that is commercially available is Verilog Compiler Simulator (VCS) from Synopsys, Inc. of Mountain View, Calif.

Test parameters and monitors unit 104 can provide monitor scripts that are executed for each component in the DUT models 106. The monitor scripts output information regarding the completion status of the corresponding component or model. For example, if a model of a component fails to complete correctly, the status can be described as "incomplete". Models that complete correctly will have a response to every request and can have a status of "complete". For each transaction, the monitors can provide information regarding the component, the transaction, and whether or not the transaction completed to results database 112. Test parameters include the input assignment to the DUT and the constraints that need to be applied to mimic the environment in which the DUT is expected to execute correctly.

History database 114 and pattern database 115 includes information and results related to previous simulations. Copies of information from results database 112 can be stored in history database 114 and/or pattern database 115 along with other the other information for a particular simulation. Pattern database 115 can include information regarding previous failures that can be used to identify failures in future simulations.

Completeness requirements 120 for a transaction comprises of the set of the expected response(s) from the system to conclude that it has completed successfully. The history database 114 stores the sequence of queries used to obtain the desired data to debug a failure successfully.

Figure 2:
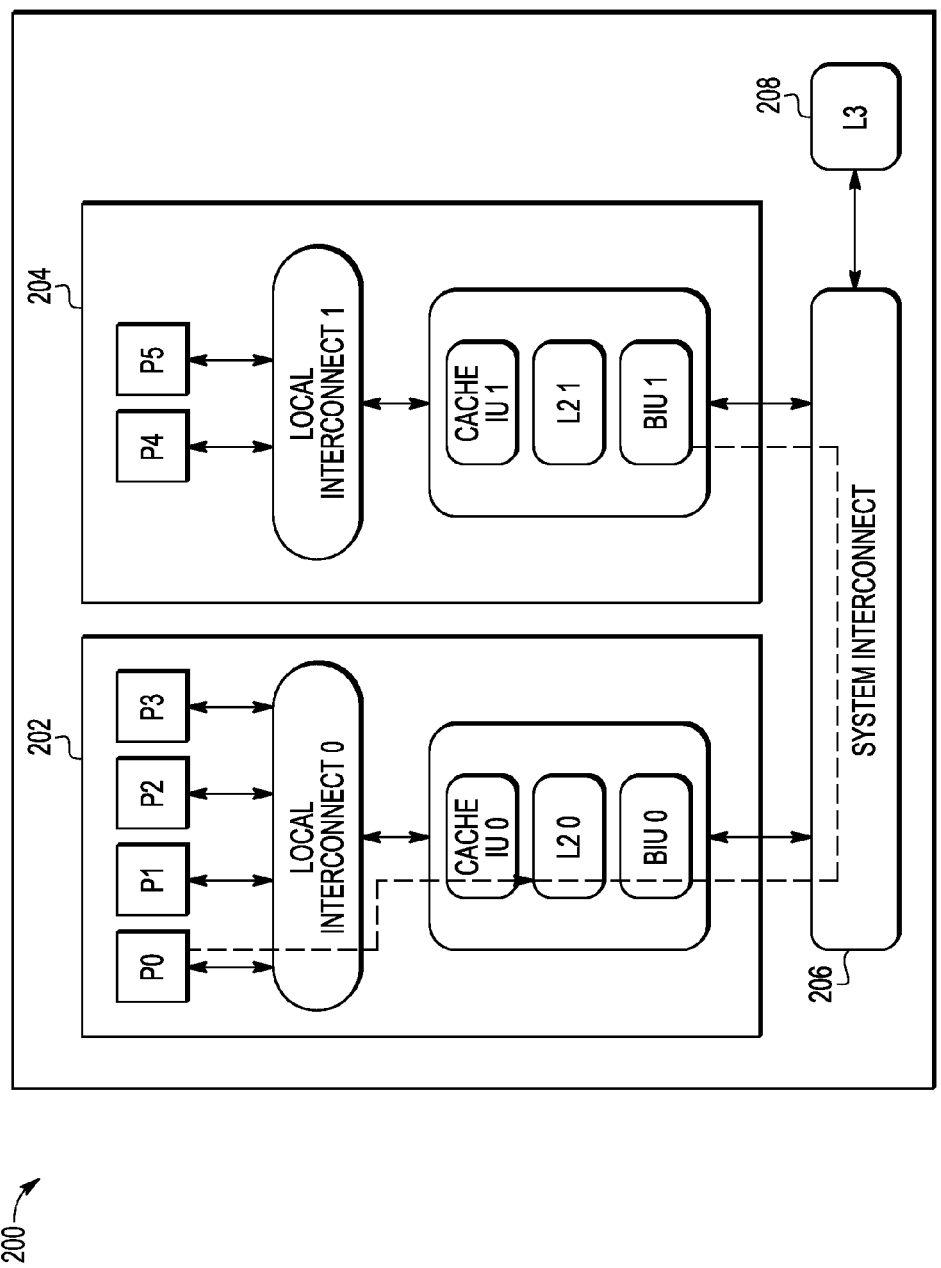
FIG. 2 shows a block diagram of an example of a multi-component device that can be tested and analyzed using the processing system of FIG. 1.

Referring to FIGS. 1 and 2, FIG. 2 shows a block diagram of an example of a multi-component device 200 that can be simulated and analyzed using the processing system 100 of FIG. 1. Device 200 includes master processor 202 and a slave processor 204 coupled to level 3 cache 208 via system interconnect 206. Processor 202 is a multi-core device with four processing cores, a local interconnect, a level 1 cache module, a level 2 cache module, and a branch instruction unit. Processor 204 is also a multi-core device such as a digital signal processor that includes 2 processing cores, a local interconnect, a level 1 cache unit, a level 2 cache unit, and a branch instruction unit. The performance and function of each of the processing cores, interconnects, cache units, and branch instruction units can be represented by a corresponding DUT model 106 that can be executed by simulator 128. Device 200 is only one example of a system that can be simulated and analyzed using system 100. Representations of other multi-component devices such as circuit boards, integrated circuits, power supplies, and any other electronic device than can be modeled mathematically, can be analyzed using system 100.

Figure 3:
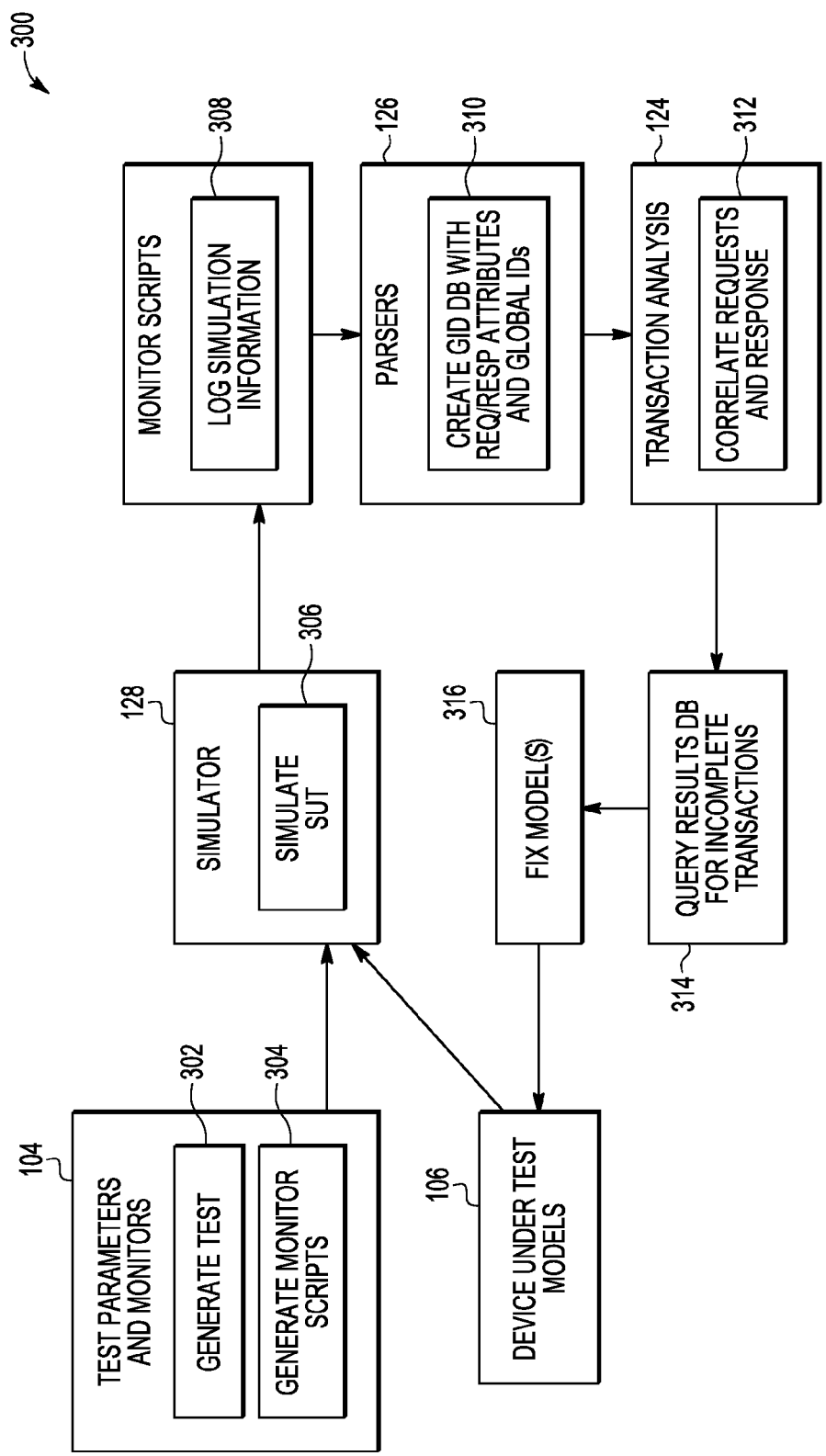
FIG. 3 is a flow diagram of an embodiment of a method for debugging a multi-component device that can be used with the processing system of FIG. 1.

Referring to FIGS. 1 and 3, FIG. 3 is a flow diagram of an embodiment of a method 300 for debugging a multi-component device using components of system 100. Process 302 includes generating test parameters such as inputs to the multi-component DUT and test sequence. Process 304 includes generating scripts to implement the monitors. Each component in the DUT model that is to be monitored uses one of the monitor scripts. A monitor is a simulator specific software construct that observes the values of specific signals at specific simulation time cycles and prints them to the log file. The test parameters and monitors can be developed by a user and considered part of the test parameters and monitors unit 104 of FIG. 1. The test parameters and monitors unit 104 and DUT models 106 are provided to simulator 128. Simulator 128 executes the DUT models 106 and monitor scripts in process 306.

Process 308 includes the monitor scripts logging simulation information in log file 108. Multiple components can be involved in performing a transaction. For example, a load request may require issuing requests to different levels of cache memory if the data requested is not in the first level of memory. Accordingly, if all or at least several of the component models include a monitor script, process 308 can include creating a log file that includes information regarding the component, the transaction, a global identifier, and any other information that can be used to help pinpoint the component that was not able to complete a particular transaction due to a design fault or other type of error. For example, to analyze device 200 in FIG. 2, a monitor may be created and executed for each of the processing cores, local interconnects, level 1 and level 2 cache modules, and branch instruction units of master processor 202 and slave processor 204, level 3 cache 208, and system interconnect 206. Being able to readily determine the faulty component helps speed up the process of debugging the design for the DUT.

Once a simulation has been performed and the log file 108 has been created, process 310 can include creating GID database 110 in which global identifiers are associated with request/response attributes for transactions. Transactions that are performed by multiple components in device 200 have the same global identifier. Process 312 can be performed by transaction analysis unit 128 and can include using the GID database 110 to correlate the request/response attributes for each transaction. Transactions that issued a request but did not receive a response to the request can be considered incomplete, whereas transactions that received a response to a corresponding request can be considered complete. The correlated results can be stored in results database 112.

Process 314 includes querying results database 112 to determine whether any of the transactions have not been completed. Information regarding the component that could not complete a transaction is included in results database 112 so that even when multiple components are required to complete a transaction, the particular component out of the multiple components that could not complete the transaction can be identified in process 314. Process 316 can include fixing the design of the faulty component(s) and iteratively simulating the multi-component device until all transactions are completed.

Figure 4:
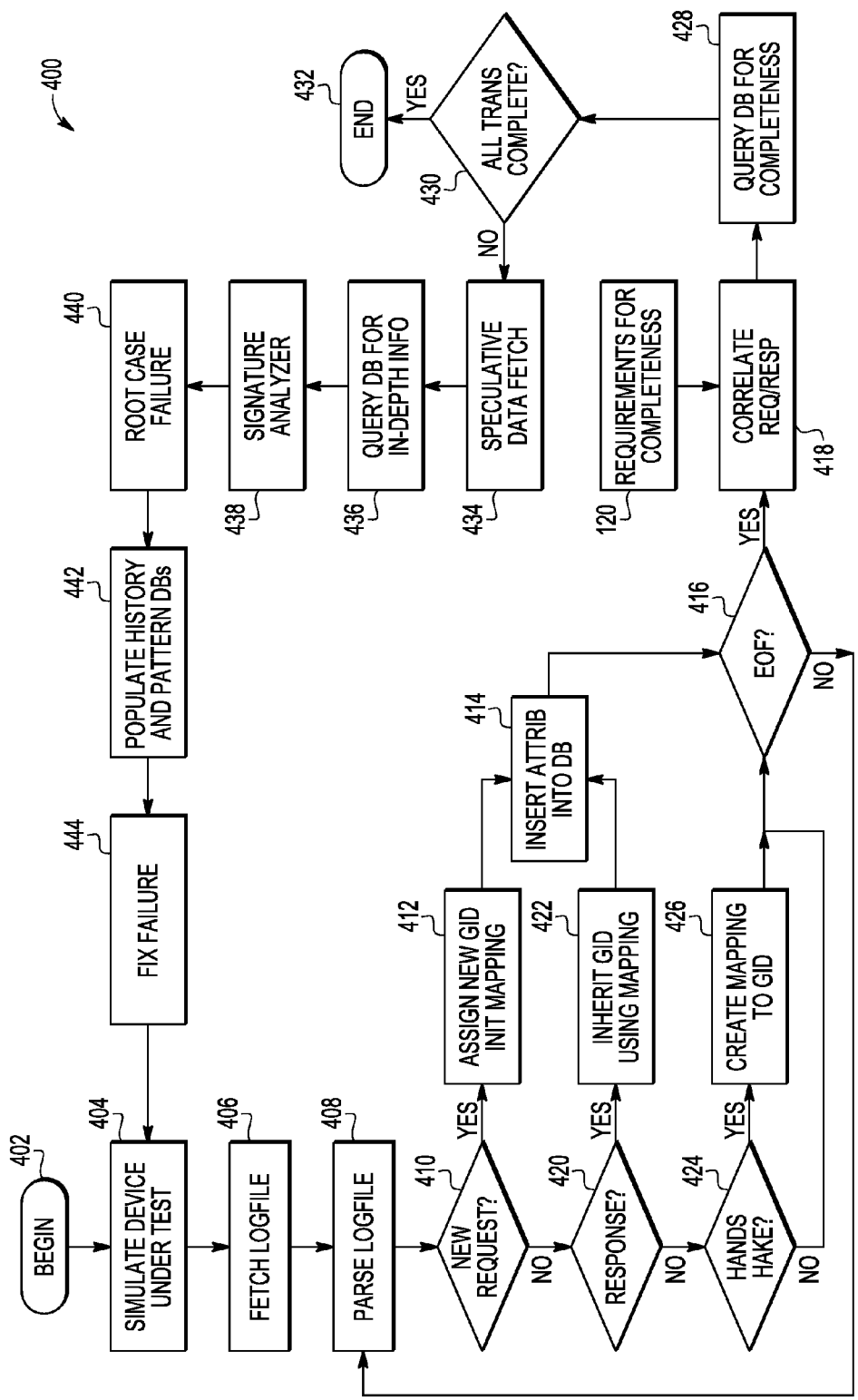
FIG. 4 is a flow diagram of another embodiment of a method for debugging a multi-component device that can be simulated using the processing system of FIG. 1.

FIG. 4 is a flow diagram of another embodiment of a method 400 for debugging a multi-component device that can be implemented in the processing system 100 of FIG. 1. Beginning with process 402, flow transitions to process 404 in which a simulation is run using software program models for the device under test (DUT). Monitors for the DUT models generate entries in a log file that include a global identifier for a transaction along with the component issuing a request or receiving a response. The monitors make an entry in the log file each time a particular component issues a request and each time a component receives a response during a transaction. The entries can also include a local identifier for each transaction that uniquely identifies a transaction from other transactions within a particular component or functional block of the device under test Once the simulation is finished, process 406 includes requesting and receiving the log file of the simulation. The log file can be stored in storage circuitry such as an optical, magnetic, or solid state computer memory device.

Process 408 includes parsing the log file to determine whether an entry in the log file pertains to a new transaction, a response, or a request that is part of a transaction with multiple requests. When a transaction requires more than one request/response pair to complete, the global identifier can be assigned to the first component that starts that transaction and inherited by the other components that are used for the transaction. In the embodiment shown, process 410 can determine whether an entry in the log file pertains to a new request. Process 420 can determine whether the entry pertains to a response to a request. Process 424 can determine whether the entry pertains to a "handshake" request associated with a previously generated request based on whether the entry is associated with the same global identifier as another request.

In response to determining that a transaction is a new request, process 412 assigns a global identifier to the new request which uniquely identifies the new request among new requests of all functional blocks of the device under test. The global identifier is stored in a global database entry corresponding to the new request. The global database entry can include the global identifier of the new request, an indicator of a component or functional block of the device under test which generated the new request, and a local identifier uniquely identifying the new request within the first functional block. After process 412 is performed, process 414 can access mapping logic or circuitry to initialize a mapping entry corresponding to the global identifier. Each mapping entry of the mapping circuitry corresponds to a unique global identifier and includes an indicator of the functional block of the device under test which generated the new request and the local identifier uniquely identifying the new request within the functional block which generated the new request.

In response to determining that a transaction is a response generated by a functional block of the device under test in process 420, process 422 can use the mapping circuitry to assign an inherited global identifier to the response. The inherited global identifier corresponds to a previous new request or a handshake request which was received at the functional block which generated the response. The previous new request or handshake request can have a corresponding local identifier which uniquely identifies the previous new or handshake request within the functional block which generated the response. After process 422, process 414 can store a global database entry corresponding to the response. The global database entry corresponding to the response can include the inherited global identifier, an indicator of the functional block which generated the response, and the corresponding local identifier which uniquely identifies the previous handshake request within the functional block which generated the response.

In response to determining that a transaction is a handshake request corresponding to a previously generated request for a particular component or functional block of the device under test, i.e., part of a multi-request transaction, in process 424, process 426 uses the global identifier database (also referred to as mapping circuitry) to determine the global identifier of the previously generated request. Process 426 can then assign the global identifier of the previously generated request to the handshake request, and store another entry in the global identifier database corresponding to the handshake request that includes the global identifier corresponding to the previously generated request, an indicator of a functional block which generated the previously generated request, an indicator of the functional block which received the previously generated request, a local identifier uniquely identifying the previously generated request within the functional block which generated the previously generated request, and a local identifier uniquely identifying the handshake request within the functional block which received the previously generated request. The functional block that generated the previously generated request can be different from the functional block which receives the previously generated request. Additionally, the local identifier uniquely identifying the previously generated request can be independent from the local identifier uniquely identifying the handshake request.

Process 426 can further include updating a mapping entry in the global identifier database or mapping circuitry which corresponds to the global identifier of the previously generated request with information of the handshake request. The update can include storing, in the mapping entry, an indicator of the functional block which received the previously generated request and a local identifier uniquely identifying the handshake request within the functional block which received the previously generated request.

Once process 414 or process 426 is complete, process 416 determines whether the end of the log file has been reached. When the end of the log file has been reached, process 418 can correlate global entries stored in the global identifier database which have a same global identifier. Process 418 can correlate the entries by determining whether each request associated with particular global and local identifiers has a corresponding response associated with the same global and local identifiers. Process 418 can also use other requirements for determining whether or not a transaction is complete, such as requirements provided by completeness requirements 120 (FIG. 1), if any.

For each unique global identifier, process 428 includes determining whether the correlated global entries having the unique global identifier correspond to a complete or incomplete transaction or set of transactions. The results of process 428 can be stored in storage circuitry, such as results database 112 (FIG. 1).

For each unique global identifier, in response to determining that the correlated global entries having the unique global identifier correspond to an incomplete transaction or set of transactions in process 430, Process 434 performs a speculative data fetch by accessing history database 114 (FIG. 1) to identify a related prior failure, and repeats the sequence of queries stored to obtain data that is most likely needed to identify the cause of the failure. Process 436 can include querying the results of process 428 using correlated global identifiers which correspond to the incomplete set of transactions. Process 438 can include analyzing the failure signature by examining the debug data to identify patterns similar to those in the pattern database 115 (FIG. 1) and provide a prior history of debugging similar failures.

Process 440 can include identifying one or more functional blocks or components that are a cause of failure for incomplete transactions based on the data from the results.

Process 440 can include identifying one or more functional blocks or components that are a cause of failure for incomplete transactions based on the data from the results.

Process 442 can include populating history database 114 and pattern database 115 with information from the current simulation that may be used to help identify failures in subsequent simulations.

From process 444, method 400 transitions to process 404 to execute the simulation for the revised device under test.

FIG. 5 illustrates examples of entries 502-518 in an embodiment of global identifier database 110 that can be used in the processing system 100 of FIG. 1 to test and analyze the device under test 200 of FIG. 2. Entries 502-518 can include a global identifier, a processor cycle value, an indicator of the component or functional block in the device under test that generated the transaction request or response, a local tag, an indicator of the type of request, and attributes associated with the transaction. For example, entry 502 corresponds to a new LOAD request assigned a global identifier of "0" that originated from processing core P0 of master processor 202 in device 200 (FIG. 2) at processing cycle 1278238.

Entry 504 corresponds to another new LOAD request assigned a global identifier of "1" that originated from processing core P5 of slave processor 204 in device 200 (FIG. 2) at processing cycle 1278238.

Entry 506 was entered at processing cycle 1278300 and corresponds to a handshake request from processing core P0 to cache instruction unit (CIU0) of master processor 202. The handshake request of entry 506 inherited the global identifier of "0" since the handshake request is part of the same LOAD transaction for entry 502. Entries 502 and 506 are examples of entries that can result when a cache hit occurs and the requested data is loaded from level 1 cache memory associated with master processor 202. Attributes for entry 506 include a local tag or identifier with a value of 0X1 that is assigned and used by processing core P0 to distinguish between transactions that are in progress within processing core P0. The local tags are not unique with regard to local tags used by other components in device 200 and are not visible to other components of device 200.

Entry 508 was entered at processing cycle 1278320 and corresponds to a handshake request from processing core P5 to cache instruction unit (CIU1) of slave processor 204. The handshake request of entry 508 inherited the global identifier of "1" since the handshake request is part of the same LOAD transaction for entry 504. Entries 504 and 508 are examples of entries that can result when a cache hit occurs and the requested data is loaded from level 1 cache memory associated with slave processor 204. Attributes for entry 508 include a local tag with a value of 0X2 that is assigned and used by processing core P5 to distinguish between transactions that are in progress within processing core P5.

Entry 510 was entered at processing cycle 1278330 and corresponds to a response from CIU0 to the request associated with global identifier "0" and local tag 0X1 that originated from processing core P0 of master processor 202. The request associated with entry 510 inherited the global identifier "0" of entry 506. Attributes for entry 510 include a first portion of the requested data and the address of the first portion of the data in CIU0.

Entry 512 was entered at processing cycle 1278350 and corresponds to a response from CIU1 to the request associated with global identifier "1" and local tag 0X2 that originated from processing core P5 of slave processor 204. The request associated with entry 512 inherited the global identifier of entry 508. Attributes for entry 512 include a first portion of the requested data and the address of the first portion of the data in CIU1.

Entry 514 was entered at processing cycle 1278390 and corresponds to a response from CIU0 to the request associated with global identifier "0" and local tag 0X1 that originated from processing core P0 of master processor 202. The request associated with entry 514 inherited the global identifier "0" of entry 506. Attributes for entry 514 include a second portion of the requested data from CIU0.

Entry 516 was entered at processing cycle 1278400 and corresponds to a response from CIU1 to the request associated with global identifier "1" and local tag 0X2 that originated from processing core P5 of slave processor 204. The request associated with entry 516 inherited the global identifier of entry 508. Attributes for entry 516 include a second portion of the requested data from CIU1.

Entry 518 was entered at processing cycle 1278410 and corresponds to a response from CIU0 to the request associated with global identifier "0" and local tag 0X1 that originated from processing core P0 of master processor 202. The request associated with entry 514 inherited the global identifier "0" of entry 506. Attributes for entry 514 include a third portion of the requested data from CIU0.

FIG. 6 illustrates examples of mapping entries 602, 604 in an embodiment of a global identifier database 110 (FIG. 1) that includes global identifier and corresponding link list information that can be used in the processing system of FIG. 1 to test and analyze the multi-component device 200 of FIG. 2. Entry 602 initially showed global identifier "0" as being associated with local tag 0X0 of master processor P0, and was updated to include local tag 0X1 associated with CIU0 as a result of entry 506 in FIG. 5. Entry 604 initially showed global identifier "1" as being associated with local tag 0X0 of slave processor P5, and was updated to include local tag 0X2 associated with CIU1 as a result of entry 508 in FIG. 5.

Note that other types of requests and responses can be implemented in system 200 in addition to or instead of the requests and responses shown in FIG. 5. The values used for the processing cycle, global identifiers, local tags, and attributes are arbitrary and provided solely for the purpose of providing examples in FIGS. 5 and 6. Other values for the processing cycle, global identifiers, local tags, and attributes can be used.

FIG. 7 illustrates entries 702-730 in an embodiment of a database 112 that includes results from the processing system of FIG. 1 to test and analyze the device under test 200 of FIG. 2. Entries 702-730 include a global identifier, processor cycle, an identity of the initiator of the transaction, the local tag of the corresponding transaction, an address in the memory, the type of transaction, and the completion status of the transaction. For example, entry 702 corresponds to a load instruction with a global identifier "0" at processor cycle 1278238, initiated by processing core P0 in master processor 202 (FIG. 2). The transaction was assigned a local tag of 0X0 by processor P0, and the transaction was completed.

As another example, entry 704 corresponds to a load instruction with a global identifier "1" at processor cycle 1278238, initiated by processing core P5 in slave processor 204 (FIG. 2). The transaction was assigned a local tag of 0X1 by processor P5, and the transaction was not completed.

In another example, entry 706 corresponds to a fetch instruction with a global identifier "2" at processor cycle 1278238, initiated by processing core P1 in master processor 202 (FIG. 2). The transaction was assigned a local tag of 0X2 by processor P1, and the transaction was completed.

In another example, entry 708 corresponds to an invalidate instruction with a global identifier "3" at processor cycle 1278238, initiated by processing core P5 in slave processor 204. The transaction was assigned a local tag of 0X0 by processor P5, and the transaction was completed.

In another example, entry 710 corresponds to a fetch instruction with a global identifier "4" at processor cycle 1278238, initiated by processing core P4 in slave processor 204. The transaction was assigned a local tag of 0X1 by processor P4, and the transaction was completed.

In another example, entry 712 corresponds to a SYNC instruction with a global identifier "5" at processor cycle 1278238, initiated by processing core P1 in master processor 202. The transaction was assigned a local tag of 0X3 by processor P1, and the transaction was completed.

In another example, entry 714 corresponds to a query instruction with a global identifier "6" at processor cycle 1278302, initiated by processing core P2 in master processor 202. The transaction was assigned a local tag of 0X4 by processor P2, and the transaction was completed.

In another example, entry 716 corresponds to a load instruction with a global identifier "7" at processor cycle 1278302, initiated by processing core P3 in master processor 202. The transaction was assigned a local tag of 0X5 by processor P3, and the transaction was completed.

In another example, entry 718 corresponds to a notify instruction with a global identifier "8" at processor cycle 1278302, initiated by processing core P0 in master processor 202. The transaction was assigned a local tag of 0X6 by processor P0, and the transaction was completed.

In another example, entry 720 corresponds to a store instruction with a global identifier "9" at processor cycle 1278330, initiated by processing core P0 in master processor 202. The transaction was assigned a local tag of 0X7 by processor P0, and the transaction was completed.

In another example, entry 722 corresponds to an abort instruction with a global identifier "10" at processor cycle 1278238, initiated by processing core P1 in master processor 202. The transaction was assigned a local tag of 0X8 by processor P1, and the transaction was completed.

In another example, entry 724 corresponds to an invalidate instruction with a global identifier "6091" at processor cycle 2655134, initiated by processing core P4 in slave processor 204. The transaction was assigned a local tag of 0X2 by processor P4, and the transaction was only partially completed.

In another example, entry 726 corresponds to a load instruction with a global identifier "6266" at processor cycle 2800926, initiated by processing core P5 in slave processor 204. The transaction was assigned a local tag of 0X3 by processor P5, and the transaction was not completed.

In another example, entry 728 corresponds to an invalidate instruction with a global identifier "6267" at processor cycle 2802718, initiated by processing core P3 in master processor 202. The transaction was assigned a local tag of 0X9 by processor P3, and the transaction was not completed.

In another example, entry 730 corresponds to a store instruction with a global identifier "6268" at processor cycle 2805278, initiated by processing core P2 in master processor 202. The transaction was assigned a local tag of 0xA by processor P2, and the transaction was not completed.

By now it should be appreciated that embodiments of systems and methods have been provided that enable designers of multi-component systems to significantly reduce the time required to identify faulty designs by using both global and local identifiers for simulated models of each of the components. Transactions are traced through the components, and component(s) that do not complete a transaction are identified, making it clear which components require design corrections.

In some embodiments, a method comprises receiving a log file from first storage circuitry. The log file includes a plurality of transactions executed within a device under test. Each transaction has corresponding local identifier uniquely identifying the transaction among transactions within a particular functional block of the device under test. For each transaction, it can be determined whether the transaction is a new request, a handshake request corresponding to a previously generated request, or a response. In response to determining that a transaction of the plurality of transactions is a new request, a global identifier can be assigned 412 to the new request which uniquely identifies the new request among new requests of all functional blocks of the device under test. A global entry corresponding to the new request can be stored. The global entry includes the global identifier of the new request, an indicator of a functional block of the device under test which generated the new request, and a local identifier uniquely identifying the new request within the first functional block.

In another aspect, in response to determining that the transaction is a new request, the method further comprises: accessing 412 mapping circuitry to initialize a mapping entry corresponding to the global identifier. Each mapping entry of the mapping circuitry corresponds to a unique global identifier. The indicator of the functional block of the device under test which generated the new request and the local identifier uniquely identifying the new request within the functional block which generated the new request are stored 412 in the initialized mapping entry.

In another aspect, in response to determining that a transaction of the plurality of transactions is a handshake request corresponding to a previously generated request that is received at a functional block of the device under test: the mapping circuitry can be used to determine a global identifier of the previously generated request. The global identifier of the previously generated request to the handshake request can be assigned. A global entry corresponding to the handshake request can be stored in a storage circuit 110. The global entry corresponding to the handshake request includes the global identifier corresponding to the previously generated request, an indicator of a functional block which generated the previously generated request, an indicator of the functional block which received the previously generated request, a local identifier uniquely identifying the previously generated request within the functional block which generated the previously generated request, and a local identifier uniquely identifying the handshake request within the functional block which received the previously generated request. The functional block which generated the previously generated request is different from the functional block which receives the previously generated request.

In another aspect, the local identifier uniquely identifying the previously generated request within the functional block which generated the previously generated request is independent from the local identifier uniquely identifying the handshake request within the functional block which received the previously generated request.

In another aspect, the local identifier uniquely identifying the previously generated request within the functional block which generated the previously generated request and the local identifier uniquely identifying the handshake request within the functional block which received the previously generated request are obtained from the log file.

In another aspect, in response to determining that the transaction is a handshake request corresponding to a previously generated request that is received at a functional block of the device under test, the method further comprises updating a mapping entry of the mapping circuitry which corresponds to the global identifier of the previously generated request with information of the handshake request.

In another aspect, the step of updating the mapping entry of the mapping circuitry which corresponds to the global identifier of the previously generated request with information of the handshake request comprises storing, in the mapping entry which corresponds to the global identifier of the previously generated request, an indicator of the functional block which received the previously generated request and a local identifier uniquely identifying the handshake request within the functional block which received the previously generated request.

In another aspect, in response to determining that a transaction of the plurality of transactions is a response generated by a functional block, the mapping circuitry can be used 422 to assign an inherited global identifier to the response. The inherited global identifier corresponds to a previous handshake request which was received at the functional block which generated the response. The previous handshake request has a corresponding local identifier which uniquely identifies the previous handshake request within the functional block which generated the response. A global entry corresponding to the response can be stored in storage circuit 110. The global entry corresponding to the response includes the inherited global identifier, an indicator of the functional block which generated the response, and the corresponding local identifier which uniquely identifies the previous handshake request within the functional block which generated the response.

In another aspect, the method can further comprise correlating 418 global entries stored in the second storage circuitry which have a same global identifier. For each unique global identifier, it can be determined 428 if the correlated global entries having the unique global identifier correspond to a complete or incomplete set of transactions.

In another aspect, the method can further comprise, for each unique global identifier, in response to determining that the correlated global entries having the unique global identifier correspond to an incomplete set of transactions, using the correlated global entries which correspond to the incomplete set of transactions to identify 440 a cause of failure.

In another aspect, in response to determining that a transaction of the plurality of transactions is a new request, the method can further comprise accessing 412 mapping circuitry to initialize a mapping entry corresponding to the global identifier with information of the new request, wherein each mapping entry of the mapping circuitry corresponds to a unique global identifier. In response to determining that a transaction of the plurality of transactions is a handshake request corresponding to a previously generated request that is received at a functional block of the device under test, the method can further comprise accessing the mapping circuitry to update a mapping entry of the mapping circuitry which corresponds to the global identifier of the previously generated request with information of the handshake request.

In another aspect, in response to determining that a transaction of the plurality of transactions is a response generated by a functional block, using the mapping circuitry to assign an inherited global identifier to the response, wherein the inherited global identifier corresponds to a previous handshake request which was received at the functional block which generated the response.

In another aspect, the device under test can be a software representation of the device under test stored in third storage circuitry, and wherein the plurality of transactions executed within the device under test are further characterized as transactions executed by a simulator.

In another embodiment, a computer system can comprise first storage circuitry configured to store a log file, wherein the log file includes a plurality of transactions executed within a device under test. Each transaction of the plurality of transactions has a corresponding local identifier uniquely identifying the transaction among transactions within a particular functional block of the device under test. Second storage circuitry can be configured to store a plurality of global entries, each of the global entries having a corresponding assigned global identifier. Third storage circuitry can be configured to store a plurality of mapping entries, each mapping entry corresponding to a unique global identifier. A transaction analyzer can be coupled to the first, second, and third storage circuitries, and configured to for each transaction of the plurality of transactions, determine whether the transaction is a new request, a handshake request corresponding to a previously generated request, or a response. In response to determining that a transaction of the plurality of transactions is a new request: a global identifier can be assigned to the new request which uniquely identifies the new request among new requests of all functional blocks of the device under test. A global entry corresponding to the new request can be stored in storage circuitry 110. The global entry can include the global identifier of the new request, an indicator of a functional block of the device under test which generated the new request, and a local identifier uniquely identifying the new request within the first functional block. A mapping entry can be stored in the third storage circuitry. The mapping entry can correspond to the global identifier of the new request and including the indicator of the functional block of the device under test which generated the new request and the local identifier uniquely identifying the new request within the functional block which generated the new request.

In another aspect, the transaction analyzer can be configured to, in response to determining that a transaction of the plurality of transactions is a handshake request corresponding to a previously generated request that is received at a functional block of the device under test, use the mapping entries to determine a global identifier of the previously generated request. The global identifier can be assigned to of the previously generated request to the handshake request. A global entry corresponding to the handshake request can be stored. The global entry corresponding to the handshake request can include the global identifier corresponding to the previously generated request, an indicator of a functional block which generated the previously generated request, an indicator of the functional block which received the previously generated request, a local identifier uniquely identifying the previously generated request within the functional block which generated the previously generated request, and a local identifier uniquely identifying the handshake request within the functional block which received the previously generated request. A mapping entry of the plurality of mapping entries which corresponds to the global identifier of the previously generated request with information of the handshake request can be updated.

In another aspect, the transaction analyzer can be configured to, in response to determining that a transaction of the plurality of transactions is a response generated by a functional block, use 422 the mapping entries to assign an inherited global identifier to the response. The inherited global identifier can correspond to a previous handshake request which was received at the functional block which generated the response. The previous handshake request can have a corresponding local identifier which uniquely identifies the previous handshake request within the functional block which generated the response. A global entry corresponding to the response can be stored. The global entry corresponding to the response can include the inherited global identifier, an indicator of the functional block which generated the response, and the corresponding local identifier which uniquely identifies the previous handshake request within the functional block which generated the response.

In another aspect, the system can include a manager coupled to the second storage circuitry which can be configured to correlate 418 global entries stored in the second storage circuitry which have a same global identifier. For each unique global identifier, it can be determined 428 if the correlated global entries having the unique global identifier correspond to a complete or incomplete set of transactions.

In another embodiment, a computer readable medium comprising instructions, which, when executed by a processor, can perform a method comprising receiving a log file from first storage circuitry. The log file can include a plurality of transactions executed within a device under test. Each transaction of the plurality of transactions can have a corresponding local identifier uniquely identifying the transaction among transactions within a particular functional block of the device under test. For each transaction of the plurality of transactions, whether the transaction is a new request, a handshake request corresponding to a previously generated request, or a response can be determined. In response to determining that a transaction of the plurality of transactions is a new request, a global identifier to the new request which uniquely identifies the new request among new requests of all functional blocks of the device under test can be assigned. A global entry corresponding to the new request can be stored. The global entry can include the global identifier of the new request, an indicator of a functional block of the device under test which generated the new request, and a local identifier uniquely identifying the new request within the first functional block.

In another aspect, in response to determining that a transaction of the plurality of transactions is a handshake request corresponding to a previously generated request that is received at a functional block of the device under test: the method can further include determining a global identifier of the previously generated request, assigning the global identifier of the previously generated request to the handshake request, and storing to the second storage circuitry 110 a global entry corresponding to the handshake request. The global entry corresponding to the handshake request can include the global identifier corresponding to the previously generated request, an indicator of a functional block which generated the previously generated request, an indicator of the functional block which received the previously generated request, a local identifier uniquely identifying the previously generated request within the functional block which generated the previously generated request, and a local identifier uniquely identifying the handshake request within the functional block which received the previously generated request.

In another aspect, in response to determining that a transaction of the plurality of transactions is a response generated by a functional block, the method can further include assigning an inherited global identifier to the response. The inherited global identifier can correspond to a previous handshake request which was received at the functional block which generated the response. The previous handshake request can have a corresponding local identifier which uniquely identifies the previous handshake request within the functional block which generated the response. A global entry corresponding to the response can be stored. The global entry corresponding to the response can include the inherited global identifier, an indicator of the functional block which generated the response, and the corresponding local identifier which uniquely identifies the previous handshake request within the functional block which generated the response.

The term "program" or "instructions," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. Peripheral and I/O circuitry may also be located on separate integrated circuits or devices. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, for example, from computer readable media such as memory or other media on other computer systems. Such computer readable media may be permanently, removably or remotely coupled to an information processing system such as system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a computer system, a method comprising:
   receiving a log file from first storage circuitry, wherein the log file includes a plurality of transactions executed within a device under test, wherein each transaction of the plurality of transactions has corresponding local identifier uniquely identifying the transaction among transactions within a particular functional block of the device under test;
   for each transaction of the plurality of transactions, determining whether the transaction is a new request, a handshake request corresponding to a previously generated request, or a response;
   in response to determining that a transaction of the plurality of transactions is a new request:
   assigning a global identifier to the new request which uniquely identifies the new request among new requests of all functional blocks of the device under test; and
   storing to second storage circuitry a global entry corresponding to the new request, wherein the global entry includes the global identifier of the new request, an indicator of a functional block of the device under test which generated the new request, and a local identifier uniquely identifying the new request within the first functional block.

2. The method of claim 1, wherein, in response to determining that the transaction is a new request, the method further comprises:
   accessing mapping circuitry to initialize a mapping entry corresponding to the global identifier, wherein each mapping entry of the mapping circuitry corresponds to a unique global identifier; and
   storing, in the initialized mapping entry, the indicator of the functional block of the device under test which generated the new request and the local identifier uniquely identifying the new request within the functional block which generated the new request.

3. The method of claim 2, further comprising:
   in response to determining that a transaction of the plurality of transactions is a handshake request corresponding to a previously generated request that is received at a functional block of the device under test:
   using the mapping circuitry to determine a global identifier of the previously generated request;
   assigning the global identifier of the previously generated request to the handshake request; and
   storing to the second storage circuitry a global entry corresponding to the handshake request, wherein the global entry corresponding to the handshake request includes the global identifier corresponding to the previously generated request, an indicator of a functional block which generated the previously generated request, an indicator of the functional block which received the previously generated request, a local identifier uniquely identifying the previously generated request within the functional block which generated the previously generated request, and a local identifier uniquely identifying the handshake request within the functional block which received the previously generated request, wherein the functional block which generated the previously generated request is different from the functional block which receives the previously generated request.

4. The method of claim 3, wherein the local identifier uniquely identifying the previously generated request within the functional block which generated the previously generated request is independent from the local identifier uniquely identifying the handshake request within the functional block which received the previously generated request.

5. The method of claim 3, wherein the local identifier uniquely identifying the previously generated request within the functional block which generated the previously generated request and the local identifier uniquely identifying the handshake request within the functional block which received the previously generated request are obtained from the log file.

6. The method of claim 3, wherein in response to determining that the transaction is a handshake request corresponding to a previously generated request that is received at a functional block of the device under test, the method further comprises:

updating a mapping entry of the mapping circuitry which corresponds to the global identifier of the previously generated request with information of the handshake request.

7. The method of claim 6, wherein the step of updating the mapping entry of the mapping circuitry which corresponds to the global identifier of the previously generated request with information of the handshake request comprises:
storing, in the mapping entry which corresponds to the global identifier of the previously generated request, an indicator of the functional block which received the previously generated request and a local identifier uniquely identifying the handshake request within the functional block which received the previously generated request.

8. The method of claim 6, further comprising:
in response to determining that a transaction of the plurality of transactions is a response generated by a functional block:
using the mapping circuitry to assign an inherited global identifier to the response, wherein the inherited global identifier corresponds to a previous handshake request which was received at the functional block which generated the response, wherein the previous handshake request has a corresponding local identifier which uniquely identifies the previous handshake request within the functional block which generated the response; and
storing to the second storage circuitry a global entry corresponding to the response, wherein the global entry corresponding to the response includes the inherited global identifier, an indicator of the functional block which generated the response, and the corresponding local identifier which uniquely identifies the previous handshake request within the functional block which generated the response.

9. The method of claim 8, further comprising:
correlating global entries stored in the second storage circuitry which have a same global identifier; and
for each unique global identifier, determining if the correlated global entries having the unique global identifier correspond to a complete or incomplete set of transactions.

10. The method of claim 9, further comprising:
for each unique global identifier, in response to determining that the correlated global entries having the unique global identifier correspond to an incomplete set of transactions, using the correlated global entries which correspond to the incomplete set of transactions to identify a cause of failure.

11. The method of claim 1, wherein:
in response to determining that a transaction of the plurality of transactions is a new request, the method further comprises:
accessing mapping circuitry to initialize a mapping entry corresponding to the global identifier with information of the new request, wherein each mapping entry of the mapping circuitry corresponds to a unique global identifier; and
in response to determining that a transaction of the plurality of transactions is a handshake request corresponding to a previously generated request that is received at a functional block of the device under test, the method further comprises:
accessing the mapping circuitry to update a mapping entry of the mapping circuitry which corresponds to the global identifier of the previously generated request with information of the handshake request.

12. The method of claim 11, wherein:
in response to determining that a transaction of the plurality of transactions is a response generated by a functional block:
using the mapping circuitry to assign an inherited global identifier to the response, wherein the inherited global identifier corresponds to a previous handshake request which was received at the functional block which generated the response.

13. The method of claim 1, wherein the device under test is a software representation of the device under test stored in third storage circuitry, and wherein the plurality of transactions executed within the device under test are further characterized as transactions executed by a simulator.

14. A computer system, comprising:
first storage circuitry configured to store a log file, wherein the log file includes a plurality of transactions executed within a device under test, wherein each transaction of the plurality of transactions has a corresponding local identifier uniquely identifying the transaction among transactions within a particular functional block of the device under test;
second storage circuitry configured to store a plurality of global entries, each of the global entries having a corresponding assigned global identifier;
third storage circuitry configured to store a plurality of mapping entries, each mapping entry corresponding to a unique global identifier; and
a transaction analyzer coupled to the first, second, and third storage circuitries, and configured to:
for each transaction of the plurality of transactions, determine whether the transaction is a new request, a handshake request corresponding to a previously generated request, or a response; and
in response to determining that a transaction of the plurality of transactions is a new request:
assign a global identifier to the new request which uniquely identifies the new request among new requests of all functional blocks of the device under test;
store to the second storage circuitry a global entry corresponding to the new request, wherein the global entry includes the global identifier of the new request, an indicator of a functional block of the device under test which generated the new request, and a local identifier uniquely identifying the new request within the first functional block; and
create a mapping entry in the third storage circuitry, the mapping entry corresponding to the global identifier of the new request and including the indicator of the functional block of the device under test which generated the new request and the local identifier uniquely identifying the new request within the functional block which generated the new request.

15. The computer system of claim 14, wherein the transaction analyzer is configured to:
in response to determining that a transaction of the plurality of transactions is a handshake request corresponding to a previously generated request that is received at a functional block of the device under test:
use the mapping entries to determine a global identifier of the previously generated request;
assign the global identifier of the previously generated request to the handshake request;

store to the second storage circuitry a global entry corresponding to the handshake request, wherein the global entry corresponding to the handshake request includes the global identifier corresponding to the previously generated request, an indicator of a functional block which generated the previously generated request, an indicator of the functional block which received the previously generated request, a local identifier uniquely identifying the previously generated request within the functional block which generated the previously generated request, and a local identifier uniquely identifying the handshake request within the functional block which received the previously generated request; and updating a mapping entry of the plurality of mapping entries which corresponds to the global identifier of the previously generated request with information of the handshake request.

16. The computer system of claim 14, wherein the transaction analyzer is configured to:

in response to determining that a transaction of the plurality of transactions is a response generated by a functional block:

use the mapping entries to assign an inherited global identifier to the response, wherein the inherited global identifier corresponds to a previous handshake request which was received at the functional block which generated the response, wherein the previous handshake request has a corresponding local identifier which uniquely identifies the previous handshake request within the functional block which generated the response; and store to the second storage circuitry a global entry corresponding to the response, wherein the global entry corresponding to the response includes the inherited global identifier, an indicator of the functional block which generated the response, and the corresponding local identifier which uniquely identifies the previous handshake request within the functional block which generated the response.

17. The computer system of claim 14, further comprising: a manager coupled to the second storage circuitry which is configured to:

correlate global entries stored in the second storage circuitry which have a same global identifier; and for each unique global identifier, determine if the correlated global entries having the unique global identifier correspond to a complete or incomplete set of transactions.

18. A non-transitory computer readable medium comprising instructions, which, when executed by a processor, perform a method comprising:

receiving a log file from first storage circuitry, wherein the log file includes a plurality of transactions executed within a device under test, wherein each transaction of the plurality of transactions has corresponding local identifier uniquely identifying the transaction among transactions within a particular functional block of the device under test;

for each transaction of the plurality of transactions, determining whether the transaction is a new request, a handshake request corresponding to a previously generated request, or a response;

in response to determining that a transaction of the plurality of transactions is a new request:

assigning a global identifier to the new request which uniquely identifies the new request among new requests of all functional blocks of the device under test; and storing to second storage circuitry a global entry corresponding to the new request, wherein the global entry includes the global identifier of the new request, an indicator of a functional block of the device under test which generated the new request, and a local identifier uniquely identifying the new request within the first functional block.

19. The non-transitory computer readable medium of claim 18, comprising instructions, which, when executed, perform the method further comprising:

in response to determining that a transaction of the plurality of transactions is a handshake request corresponding to a previously generated request that is received at a functional block of the device under test:

determining a global identifier of the previously generated request;

assigning the global identifier of the previously generated request to the handshake request; and storing to the second storage circuitry a global entry corresponding to the handshake request, wherein the global entry corresponding to the handshake request includes the global identifier corresponding to the previously generated request, an indicator of a functional block which generated the previously generated request, an indicator of the functional block which received the previously generated request, a local identifier uniquely identifying the previously generated request within the functional block which generated the previously generated request, and a local identifier uniquely identifying the handshake request within the functional block which received the previously generated request.

20. The non-transitory computer readable medium of claim 19, comprising instructions, which, when executed, perform the method further comprising:

in response to determining that a transaction of the plurality of transactions is a response generated by a functional block:

assigning an inherited global identifier to the response, wherein the inherited global identifier corresponds to a previous handshake request which was received at the functional block which generated the response, wherein the previous handshake request has a corresponding local identifier which uniquely identifies the previous handshake request within the functional block which generated the response; and storing to the second storage circuitry a global entry corresponding to the response, wherein the global entry corresponding to the response includes the inherited global identifier, an indicator of the functional block which generated the response, and the corresponding local identifier which uniquely identifies the previous handshake request within the functional block which generated the response.

* * * * *